No. 782,601. PATENTED FEB. 14, 1905.
W. H. DIDLAKE.
COMBINED RAILWAY CAR TRUCK AND FRAME.
APPLICATION FILED NOV. 30, 1904.
7 SHEETS—SHEET 1.
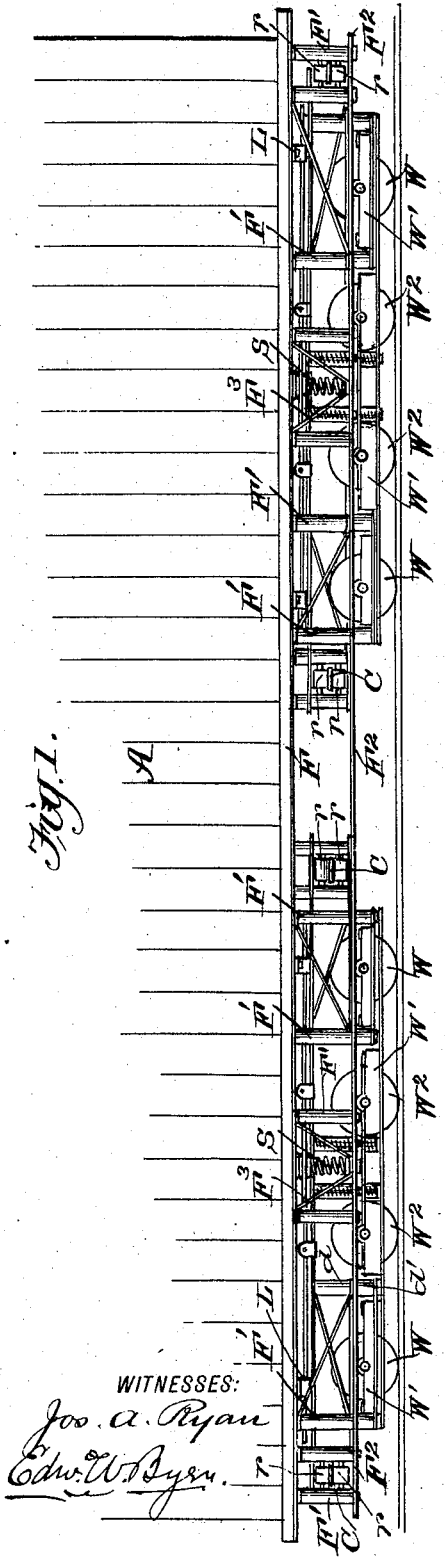
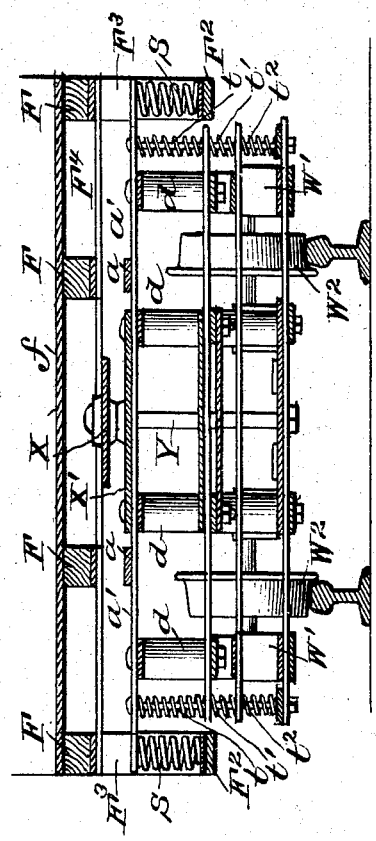
WITNESSES:
Jos. A. Ryan
Edw. W. Byrn.
INVENTOR
William H. Didlake.
BY Munn & Co.
ATTORNEYS No. 782,601. PATENTED FEB. 14, 1905.
W. H. DIDLAKE.
COMBINED RAILWAY CAR TRUCK AND FRAME.
APPLICATION FILED NOV. 30, 1904.
7 SHEETS—SHEET 2.
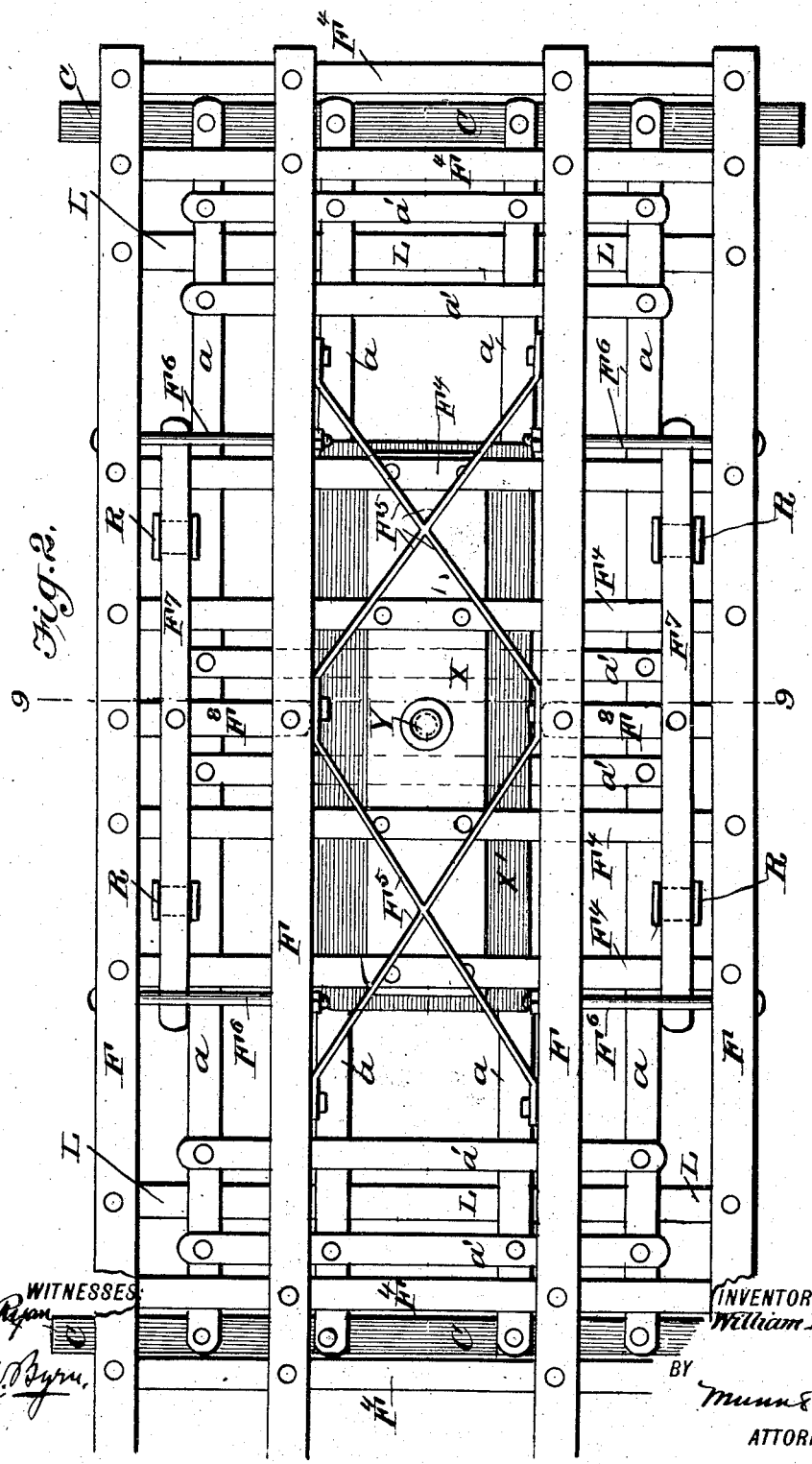

No. 782,601. PATENTED FEB. 14, 1905.
W. H. DIDLAKE.
COMBINED RAILWAY CAR TRUCK AND FRAME.
APPLICATION FILED NOV. 30, 1904.
7 SHEETS—SHEET 3.
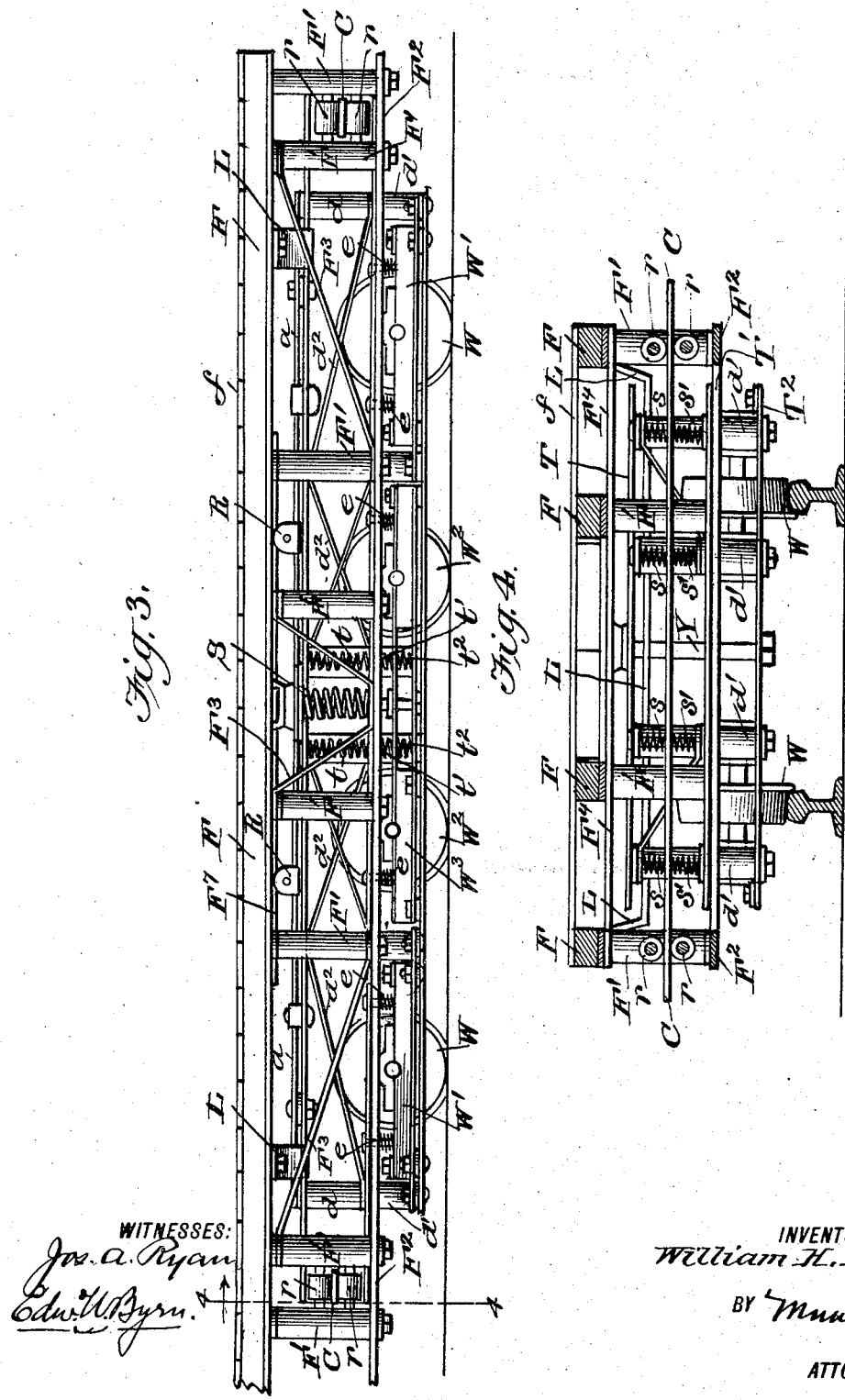
WITNESSES:
Jos. A. Ryan
Edw. U. Byrn.
INVENTOR
William H. Didlake
BY Munn & Co.
ATTORNEYS No. 782,601. PATENTED FEB. 14, 1905.
W. H. DIDLAKE.
COMBINED RAILWAY CAR TRUCK AND FRAME.
APPLICATION FILED NOV. 30, 1904.
7 SHEETS—SHEET 4.
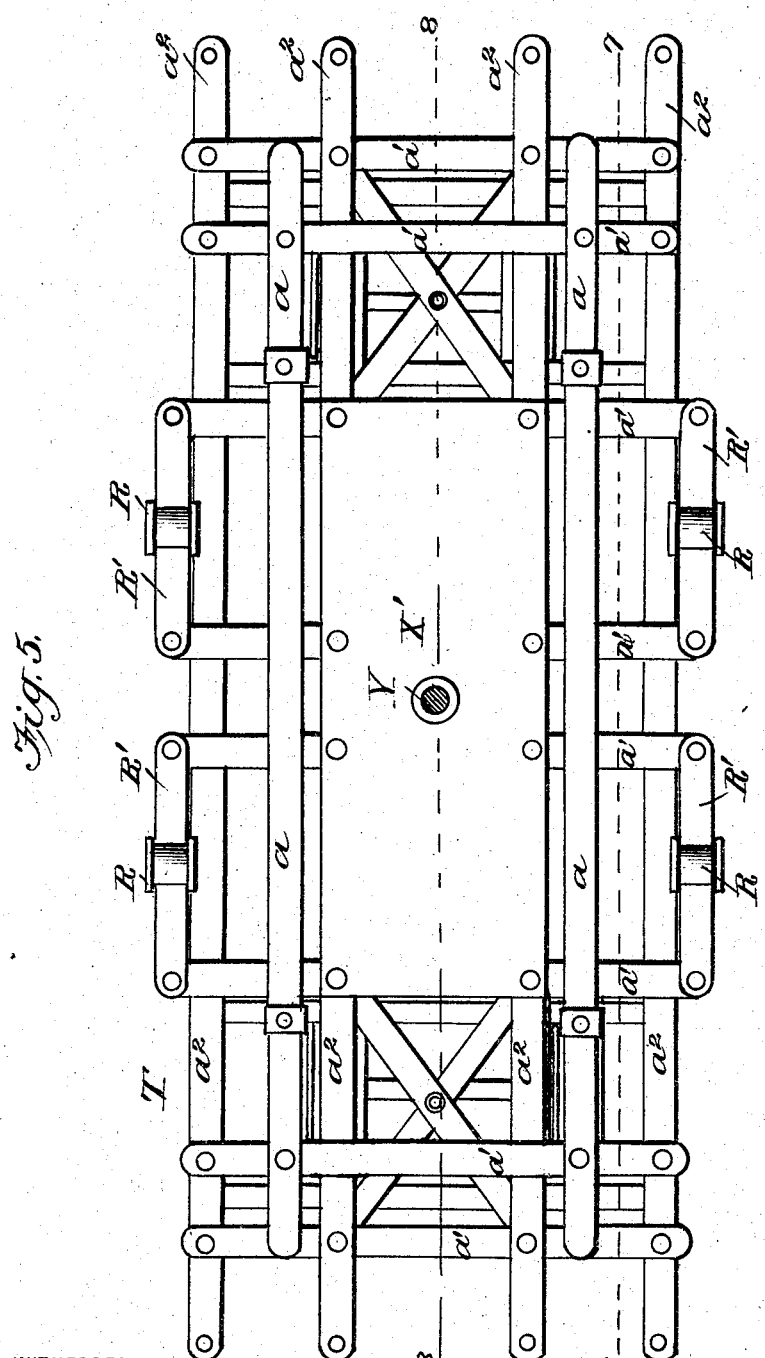
WITNESSES:
Jos. A. Ryan
Edw. W. Byrn
INVENTOR,
William H. Didlake
BY Munn & Co.
ATTORNEYS

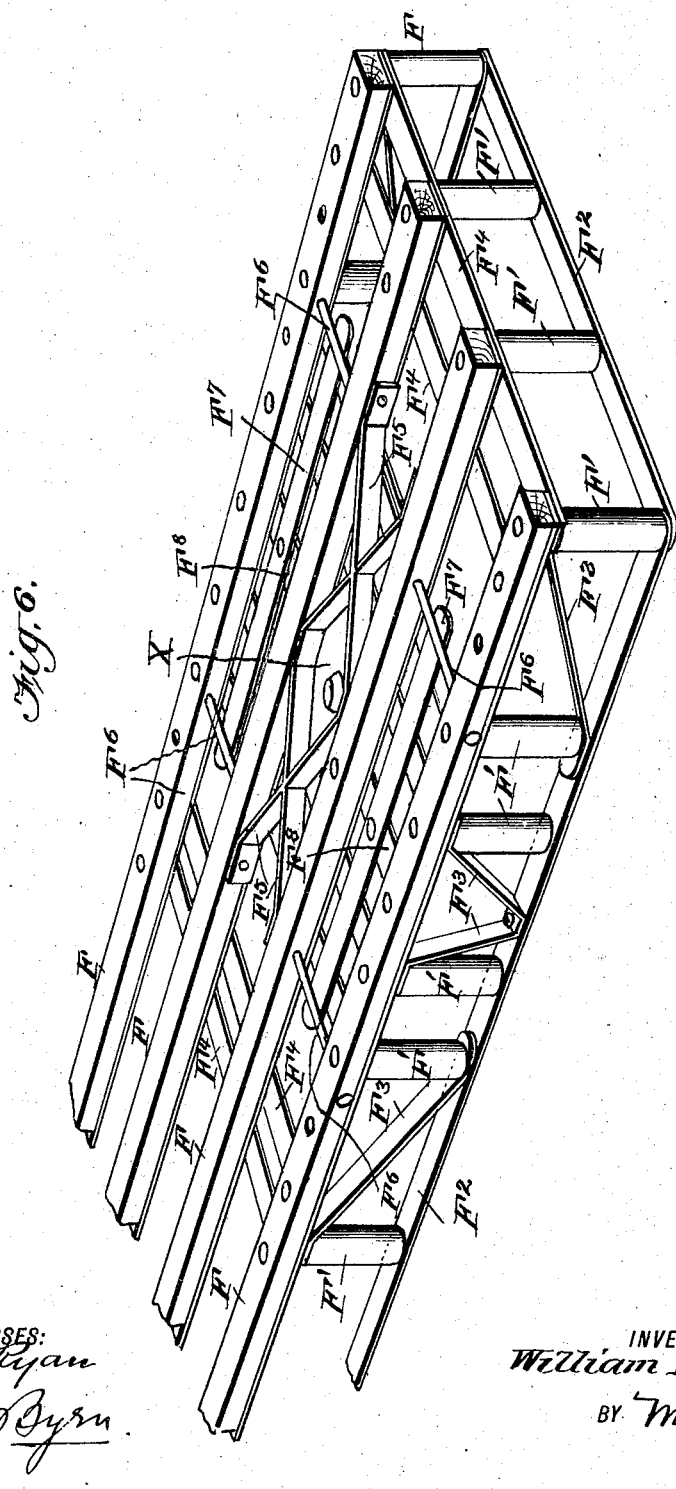

No. 782,601. PATENTED FEB. 14, 1905.
W. H. DIDLAKE.
COMBINED RAILWAY CAR TRUCK AND FRAME.
APPLICATION FILED NOV. 30, 1904.
7 SHEETS—SHEET 6.
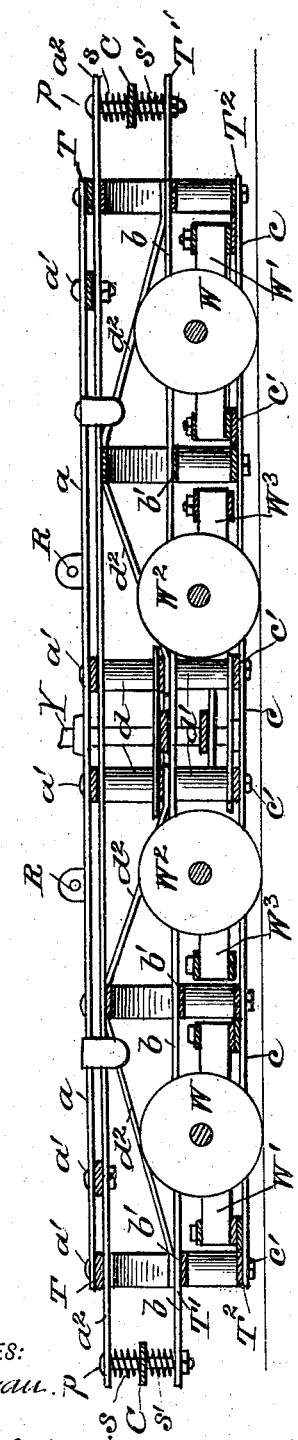
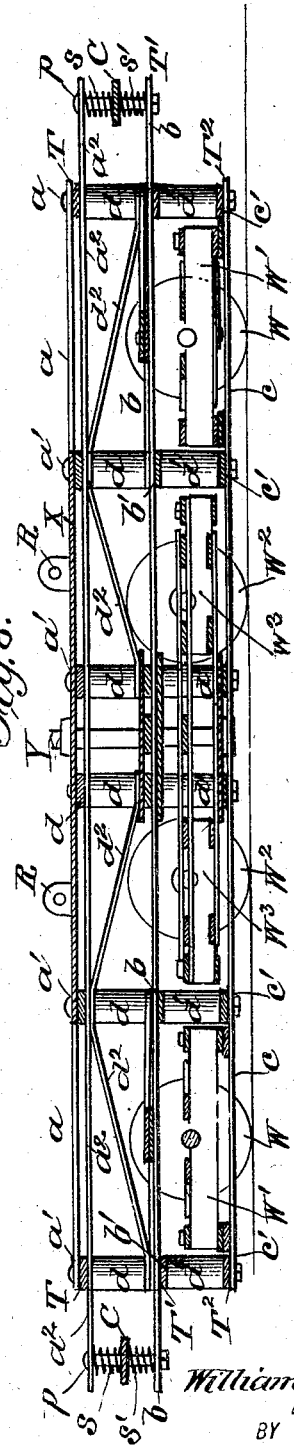
WITNESSES:
Jos. A. Ryan.
Edw. W. Byrn.
INVENTOR
William H. Didlake.
BY Munn & Co.
ATTORNEYS

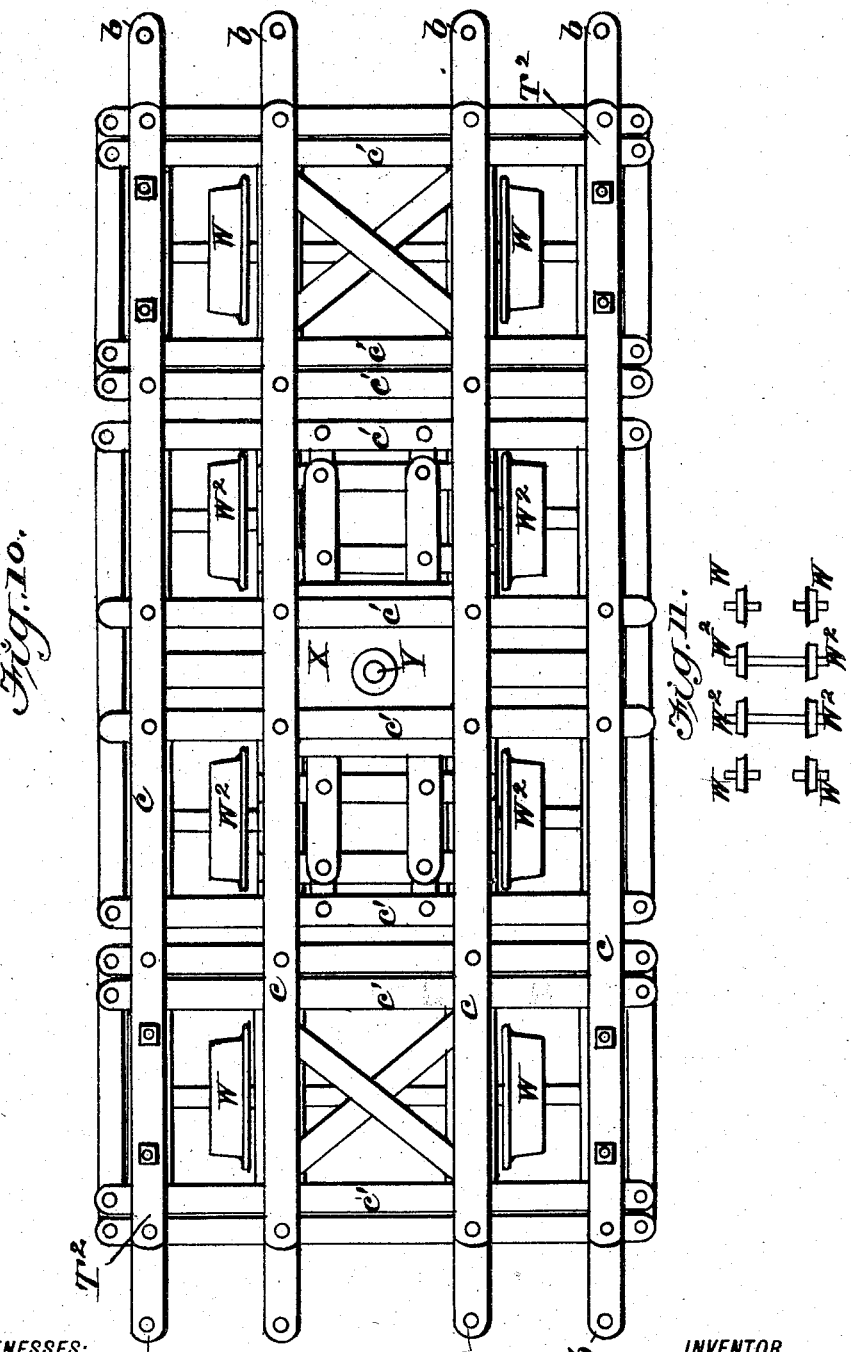

No. 782,601.
Patented February 14, 1905.

UNITED STATES PATENT OFFICE.

WILLIAM HENRY DIDLAKE, OF CRYSTALSPRINGS, MISSISSIPPI.

COMBINED RAILWAY-CAR TRUCK AND FRAME.

SPECIFICATION forming part of Letters Patent No. 782,601, dated February 14, 1905.

Application filed November 30, 1904. Serial No. 234,918.

*To all whom it may concern:*

Be it known that I, WILLIAM HENRY DIDLAKE, a citizen of the United States, residing at Crystalsprings, in the county of Copiah and State of Mississippi, have invented a new and useful Improvement in a Combined Railway-Car Truck and Frame, of which the following is a specification.

My invention is in the nature of a novel combined railway-car truck and frame.

The object of the invention is to secure a greater degree of safety as regards the separation of the car-body from the trucks, to give the car a steadier motion and more elasticity of springs, to secure an easier adjustment of the wheels to the track in turning curves, to lighten the construction of the car, and to secure other advantages, as will be hereinafter more fully described with reference to the drawings, in which—

Figure 1 is a side elevation of a car equipped with my improved trucks and connecting-frame. Fig. 2 is a top plan view of one of the car-trucks on an enlarged scale, showing on top of the truck the bottom frame of the car. Fig. 3 is a side view of the same. Fig. 4 is a vertical cross-section taken on line 4 4 of Fig. 3. Fig. 5 is a top plan view of one of the trucks with the bottom frame of the car-body removed. Fig. 6 is a perspective view of one end of this bottom frame of the car-body removed from the trucks and shown separately. Fig. 7 is a vertical longitudinal section of one of the car-trucks, taken on the line 7 7 of Fig. 5. Fig. 8 is a vertical central longitudinal section of one of the car-trucks, taken on the line 8 8 of Fig. 5. Fig. 9 is a vertical cross-section through the car-bottom frame and one of the trucks, the view being taken on the line 9 9 of Fig. 2. Fig. 10 is an underneath or bottom view of one of the car-trucks, and Fig. 11 is a diagrammatic view of a modification.

I will first describe the bottom frame of the car-body, referring more especially to Fig. 6. This consists of longitudinal sills F F, &c., running the full length of the car. On these are nailed the transverse flooring-planks $f$, as seen in Figs. 3, 4, and 9. These sills are connected together (see Fig. 6) by cross-bars $F^4$ on their under sides, and diagonal braces $F^5$ are arranged between the two middle sills at a point just above the truck. Underneath this floor-frame and extending all around the four sides of the car there are short vertical pillars $F'$, (see Fig. 6,) connected at their lower ends by continuous side bars and end bars $F^2$. This bottom frame of the car-body, as thus described, is rigid from end to end of the car, and it sits upon and extends down over the two trucks, as shown in Figs. 1 and 9, the lower bars $F^2$ of the bottom frame of the car extending down about half the vertical height of the truck and forming with the pillars $F'$ an inclosure or housing for the trucks extending over the top and sides of the same. This housing of the car-bottom is continuous from truck to truck and incloses them both, as seen in Fig. 1, the sills F and longitudinal bars $F^2$ being continuous from end to end of the car. The car-bottom frame is pivotally connected to each truck by a turn-table X X' and king-bolt Y of any approved form, as seen in Figs. 2 and 9.

I will now describe the car-truck and how it is specially adapted for coöperation with the car-body frame before referred to. The truck-frame (see Figs. 5, 7, and 8) is composed of three horizontal sections arranged parallel one above the other. The upper section T is shown in plan view in Fig. 5 and in sectional view in Figs. 7 and 8. The middle section is shown at T' in Figs. 7 and 8, and the bottom section is shown at $T^2$ in Figs. 7 and 8 and in an underneath view in Fig. 10. All these sections are made substantially alike. The upper section T, Fig. 5, has longitudinal bars $a\ a^2$ and cross-bars $a'$. The middle section, Figs. 7 and 8, has similar longitudinal bars $b$ and cross-bars $b'$, and the lower section, Figs. 7, 8, and 10, has longitudinal bars $c$ and cross-bars $c'$. The upper, middle, and lower sections are connected by short vertical pillars $d$, Fig. 8, between the upper and middle section and by short vertical pillars $d'$ between the middle and lower section. Each truck, as shown, has four pairs of wheels, as seen in Figs. 7, 8, and 10. The end wheels W W are mounted rigidly in pairs on a single axle, Fig. 10, journaled in a square frame W' and W', Figs. 7 and 8, located between the middle section T² and bottom section T² of the truck-frame. The four middle wheels W² have each an individual axle mounted in journal-boxes in a single central rectangular frame W³, also arranged in the same plane between the middle and lower sections of the truck-frame.

I will now proceed to describe the means by which the weight of the car is transmitted to and borne upon the wheels through the trucks. Referring to Figs. 2 and 6, F⁷ represents longitudinal bearing-bars bolted in the middle to short cross-bars F⁸ of the car-bottom frame and having their ends caught beneath short tie-rods F⁶. There is one of these bearing-bars on each side of the car, and each rests upon two flanged rollers R R on the truck, the same being shown in plan view in Fig. 5. The bars F⁷ are more or less elastic, and each forms a yielding bearing which springs slightly up and down and rides easily on the rollers without friction. Part of the weight of the car comes onto the trucks through these rollers R and part through the turn-table X X' and king-bolt Y. The rollers R permit a slight forward-and-backward motion. Still another portion of the weight of the car is carried by the trucks through the medium of another connection, which is a yielding connection as regards vertical motion and compensates for a slight lateral yielding between the car body and truck. This is best shown in Figs. 3 and 4. Between two of the pillars F' F' of the downwardly-projecting car-frame there is journaled just beyond each end of the truck two pairs of antifriction-rollers $r$ $r$. These rollers are carried on horizontal axes arranged longitudinally to the car, there being a pair of them on each side of the truck and at each end. Between the rollers of each pair there extends the outer ends of a cross-bar C, (see Fig. 4,) one of which is connected to the truck at each end, as seen in Figs. 7 and 8. This bar receives the weight of the car through the medium of the rollers $r$, and said bars in turn press upon the trucks in a yielding manner, as follows: The cross-bar C is perforated at its ends to receive a vertical pin $p$, which is firmly secured in the extensions of the longitudinal bars $a^2$ $b$ of the upper and middle sections of the truck-frame. Between the cross-bar C and the upper longitudinal bar $a^2$ a spiral spring $s$ is wound about the pin, and between the cross-bar and the lower middle longitudinal bar $b$ a similar spiral spring $s'$ is wound about the pin. When the car-frame moves up and down, (see Fig. 4,) the rollers $r$ transmit the pressure on the cross-bar C to the springs $s$ and $s'$ and through them to the truck-frame, the springs $s'$ resisting a downward strain and the springs $s$ an upward strain. While this connection is elastic, it will be seen that the car-body and the truck may have a slight lateral motion between them, the extended ends of the cross-bars C riding freely between the rollers $r$ $r$ in horizontal direction at right angles to the truck.

In addition to the spring connections between the car frame and trucks that have been already described there are others along the sides and near the middle of each truck. These consist (see Figs. 3 and 9) of heavy coil-springs S, which are attached at their lower ends to the lower bar F² of the car-bottom frame and at their upper ends are attached to the extensions of the cross-bars $a'$ of the trucks. These are tension-springs, and part of the weight of the car is transmitted through them to the trucks. Between the truck-frame and the journal-box frames W' and W³ (see Fig. 3) there are interposed other spiral springs, $e$ $e$, carried on vertical pins, and between the several horizontal members of the truck-frame there are other spiral springs, $t$ $t'$ $t^2$, as best seen in Fig. 9.

In addition to the elastic connections between the car-bottom frame and the trucks there is another connection as a safeguard to prevent the car-body from leaving the trucks. This consists (see Figs. 3 and 4) of loop-bars L. These extend crosswise the car and at their ends are attached to the sills of the car-floor. They then extend downwardly at an angle until they reach a plane between the upper section T and middle section T' of the car-truck. The middle parts of the bars L in extending through the truck are actually coupled into the truck-frame, but are loose, so that it gives free play to the springs and various adjustments. If, however, a strain comes which would ordinarily throw the car-body off the truck this disconnection of the car-body is prevented by the loop-bars L.

It will be seen that by my improved car frame and truck the car may sit lower, so that it is not so liable to become derailed, and the downwardly-extended marginal frame not only houses and coöperates with the trucks, as before described, but it forms a stiff truss-frame for the car-body and greatly braces and stiffens the same.

In the truck as shown I employ four pairs of wheels; but I would have it understood that I may increase or decrease the number of wheels, if desired. I may also arrange the wheels so that the outer wheels may have separate axles and the inner ones may have a single axle, coupling them in pairs, as shown in Fig. 11, which is a mere reversal of the arrangement shown in Fig. 10. I may also make other minor changes without departing from the scope of my invention as set forth in the claims.

Having thus described my invention, what I claim as new, and desire to secure by Letters Patent, is—

1. A combined car truck and frame comprising floor-sills, a downwardly-extended frame attached rigidly to the sills and extending down below the tops of the truck and inclosing the same, and a truck connected to and housed within the frame substantially as described.

2. A combined car truck and frame comprising floor-sills, a downwardly-extended frame attached rigidly to the sills and extending down below the tops of the trucks and running from end to end of the car and across the ends thereof, and two trucks contained within the same substantially as shown and described.

3. A combined car truck and frame comprising a truck made in horizontal sections, a car-frame having a transverse loop-bar the ends of which are attached to the car-frame and the middle portion of which extends through one of the sections of the truck and is loosely coupled thereto substantially as described.

4. A combined car truck and frame comprising a truck made in horizontal sections, a car-frame having a downward extension all around its edges and inclosing the truck, and a transverse bar connected at its ends to the car-frame and having its middle portion extended through and loosely coupled to one of the sections of the truck substantially as shown and described.

5. A combined car truck and frame comprising a truck made in horizontal sections, a car-frame having a downward extension all around its edges and inclosing the truck, friction-rollers arranged in the same along the sides of the car, and a cross-bar connected to the trucks and having its ends extended between said rollers substantially as shown and described.

6. A combined car truck and frame comprising a truck made in horizontal sections with longitudinal bars, a car-frame having a downward extension all around its sides and inclosing the truck, friction-rollers arranged in the same along the sides of the car, a cross-bar extending between these rollers, vertical pins connecting this cross-bar to the longitudinal bars of the truck, and springs arranged above and below the cross-bar and between it and the longitudinal bars of the truck substantially as shown and described.

7. A combined car truck and frame comprising a truck bearing on its upper surface rollers arranged on transverse axes, a car-frame having a downward extension along its edges inclosing the truck, longitudinally-arranged spring-bars $F^7$ $F^7$ rigidly fixed to the car-frame and riding on the rollers substantially as shown and described.

8. A combined car truck and frame comprising a truck having cross-bars extending beyond the trucks, a car-frame having a downward extension along its sides surrounding and inclosing the truck and suspension-springs interposed between the lower part of said downward extension and the cross-bar of the truck substantially as shown and described.

9. A combined car truck and frame comprising a truck, a car-frame consisting of longitudinal sills, downwardly-extending pillars arranged along the sides and ends, bars connecting the lower ends of said pillars, diagonal braces for said bars and spring connections between said car-frame and the truck substantially as shown and described.

10. A combined car truck and frame consisting of a truck having its frame made in three parallel sections, each formed of longitudinal bars and cross-bars connected by pillars, car-wheels with journal-box frames arranged between the middle section and the lower section, a car-frame having a downward extension along its sides and ends inclosing the trucks, springs connecting the car frame and truck and a king-bolt and turn-table substantially as shown and described.

WILLIAM HENRY DIDLAKE.

Witnesses:
EDWARD C. GODMAN,
IKE SMITH.